US006823526B2

(12) United States Patent
Howard et al.

(10) Patent No.: US 6,823,526 B2
(45) Date of Patent: Nov. 23, 2004

(54) COMPUTER-BASED SYSTEM AND METHOD FOR AUTOMATIC CONFIGURATION OF AN EXTERNAL DEVICE

(75) Inventors: Dennis Wayne Howard, Eagle, ID (US); Brent Jay Blazek, Meridian, ID (US); Dean R. VandeWater, Boise, ID (US); Keith O. Johnson, deceased, late of McKinney, TX (US); by Ernest Lee Johnson, legal representative, Spanish Fork, UT (US); by Richard A. Wiltbank, legal representative, American Fork, UT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 09/900,352

(22) Filed: Jul. 5, 2001

(65) Prior Publication Data

US 2003/0009604 A1 Jan. 9, 2003

(51) Int. Cl.[7] ............................................... G06F 9/00
(52) U.S. Cl. ..................................................... 719/327
(58) Field of Search ................................ 709/327, 324, 709/328; 719/321, 327, 324, 328

(56) References Cited

U.S. PATENT DOCUMENTS

| | | | | |
|---|---|---|---|---|
| 5,774,154 A | * | 6/1998 | Underwood | 347/85 |
| 6,041,364 A | * | 3/2000 | Lortz et al. | 719/321 |
| 6,189,048 B1 | * | 2/2001 | Lim et al. | 719/330 |
| 6,378,016 B1 | * | 4/2002 | Noguchi | 710/104 |
| 6,397,327 B1 | * | 5/2002 | Klebanov | 713/1 |
| 6,418,486 B1 | * | 7/2002 | Lortz et al. | 710/10 |
| 6,480,304 B1 | * | 11/2002 | Os et al. | 358/474 |

OTHER PUBLICATIONS

Computer System and method that eliminates the need for an operating system, Jaffrey, US 2002/0103987, Aug. 1, 2002.*
Computer System and method that eliminates the need for an operating system, Jaffrey, US 2003/0200354, Oct. 23, 2003.*

* cited by examiner

Primary Examiner—John Follansbee
Assistant Examiner—Haresh Patel

(57) ABSTRACT

A system for connecting an external device and a host system includes an input/output code element on a host system linked with the external device. The input/output code element generates a device identification string. The device identification string includes an optional feature component associated with the external device. The optional feature component indicates at least one extra feature that is included with a particular external device, such as an envelope feeder for a printer or an audio component for a wireless Internet appliance. The system further includes an installer linked with the host system. The installer receives the device identification string and parses the string for the optional feature component. The installer creates an add-on identifier key in the host system's registry based on the optional feature component. The system further includes a device driver for operating all features of the external device identified by the device identification string, especially the optional feature component. In particular, the device driver accesses the add-on identifier key in the registry. The device driver includes a device driver configuration component which is modified in accordance with each add-on identifier key to include features associated with the optional feature component.

9 Claims, 8 Drawing Sheets

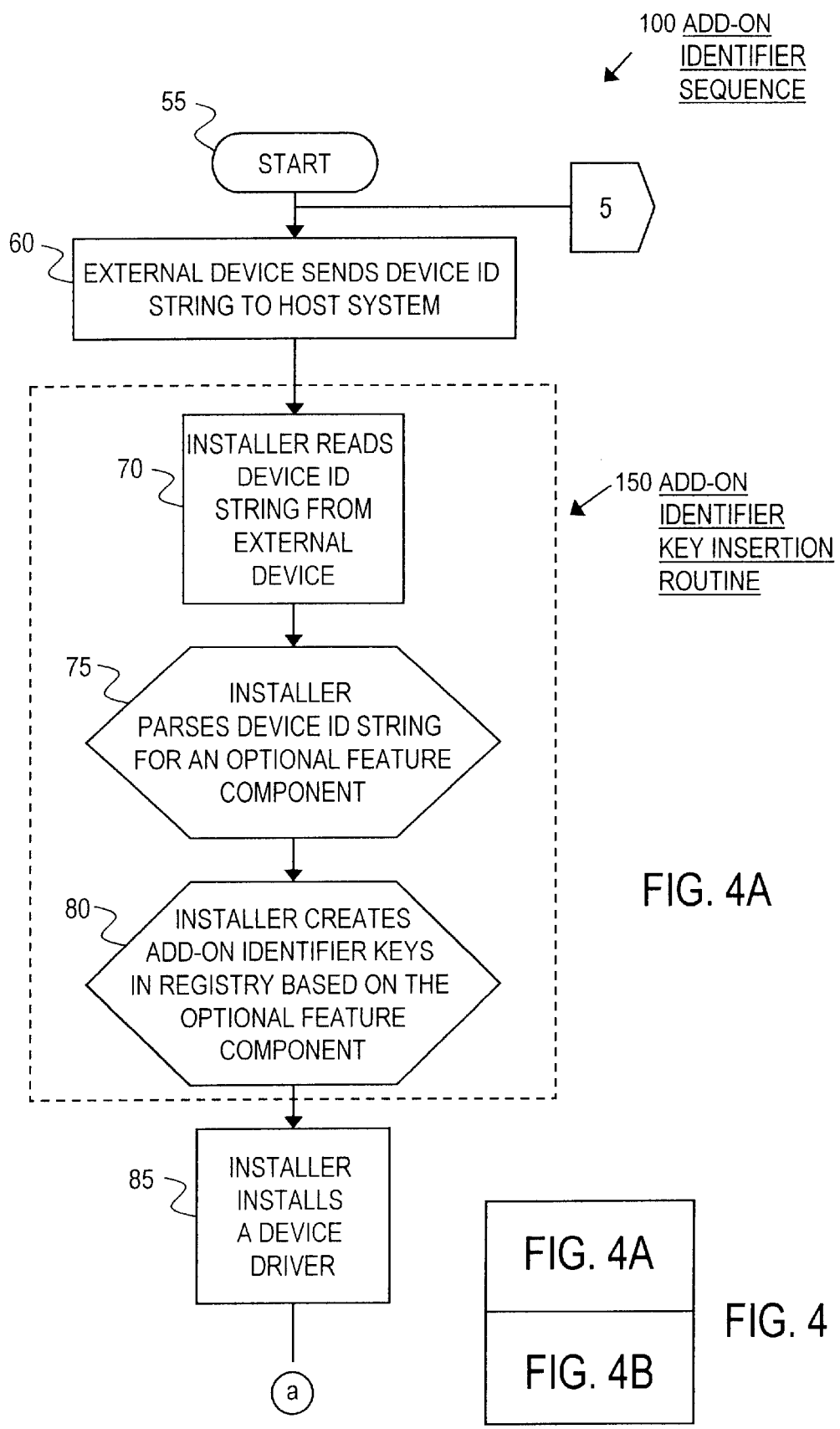

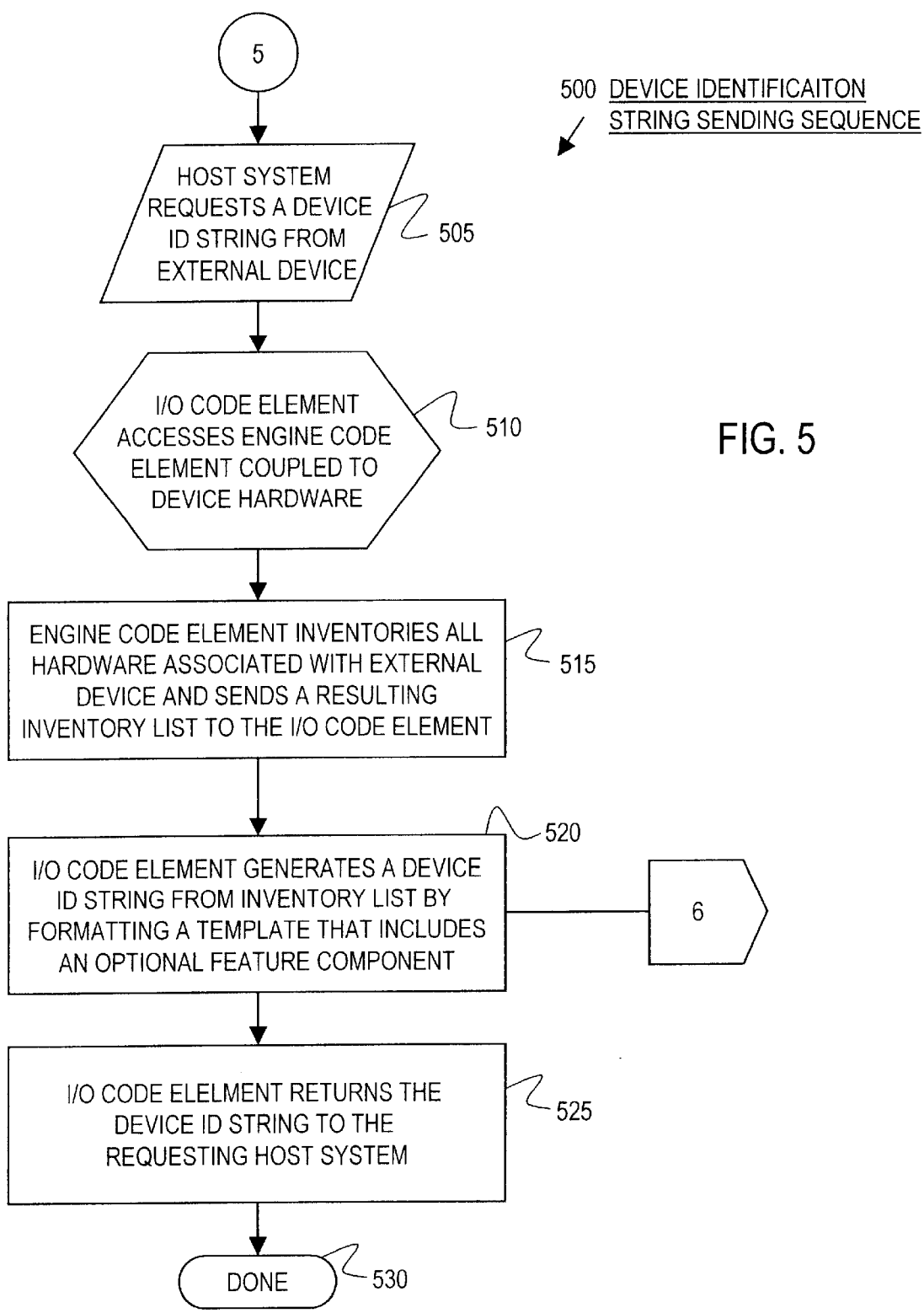

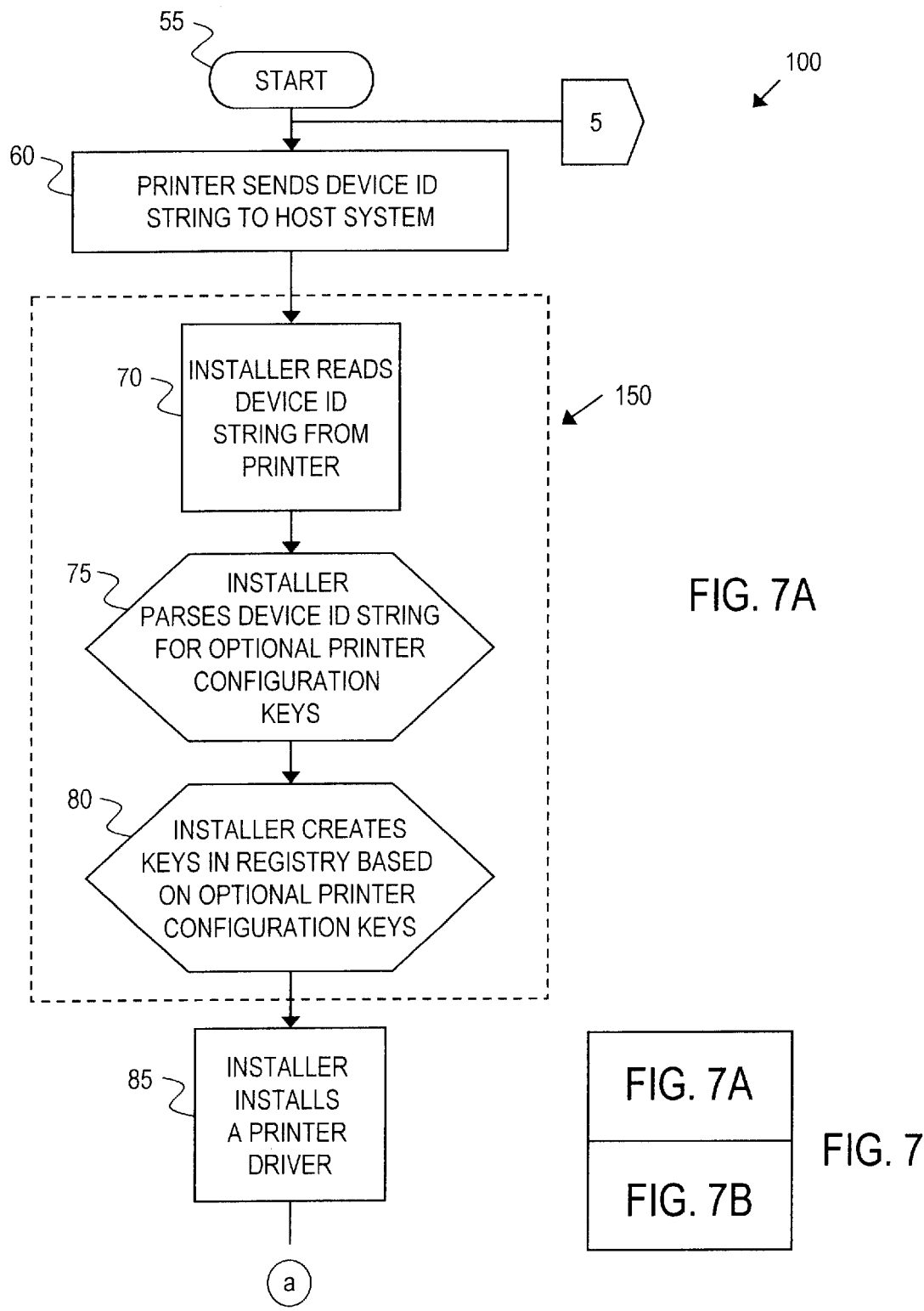

COMPUTER-BASED SYSTEM AND METHOD FOR AUTOMATIC CONFIGURATION OF AN EXTERNAL DEVICE

FIELD OF THE INVENTION

This invention relates to a computer-based system and method for recognizing features included with an external device. More particularly, this invention relates to a system for recognizing optional features included with an external device and configuring a host system to operate those features.

BACKGROUND OF THE INVENTION

Integrating an external device, such as a printer, digital imaging apparatus or an external device with a host system, such as a computer workstation or a laptop for example, requires linking hardware and software components between the external device and the host system. Typically, in terms of hardware, a cable is used to connect the external device and the host system. Parallel cables are commonly used in the industry for connecting the host system and the external device.

For software, the external device and the host system each feature software components for connecting one another. The host system initially runs an executable installation program or "installer" associated with the external device. The installer installs software in the operating system of the host system, an operating system such as Microsoft Corporation's WINDOWS for example. In general, the installer installs software for enabling the host system to operate the external device. The installer installs device drivers and other device utilities for operating the external device. The installer may also verify warranty registration and software license agreements associated with the external device.

A device driver is software that runs in the host system's operating system. The device driver translates application and operating system commands into commands that are recognized by that specific model of external device. In effect, the device driver allows applications software from the host system to be executed by the external device. For example, a printer driver allows applications software, such as word processing or graphics software for example, to print to an external printer.

As a requirement for integration with the host system, the external device carries in memory a protocol that provides a device identification string or "device idstring", such as for example DEVICEID for use with Microsoft Corporation's WINDOWS. The device idstring is a grouping of instructions transmitted from the external device to the host system. Upon receiving the device idstring, the host system's operating system recognizes that the particular external device is integrated with the host system so that the device may properly receive instructions and applications from the host system.

The device idstring is unique to the class and model of external device for connection to the host system. Commonly, each time the host system is booted up, the device idstring announces class and model of an external device that is connected to the host system. Illustratively, for a Hewlett Packard LASERJET 2200 laser printer, the device idstring indicates a printer as the class of external device and a Hewlett Packard LASERJET 2200 as the model of laser printer that is connected to the host system. Specifically, the device idstring for this laser printer indicates: "G:Hewlett-Packard;CMD:PJL,MLC,PCL,PLCXL, POSTSCRIPT;MDL:HP LaserJet2200;CLS:PRINTER; DES:Hewlett-Packard LaserJet 2200".

An external device may have a wide variety of features. Generally, each external device includes two types of features, standard and optional. For each specific model, standard features are included in every external device. For example, all Hewlett Packard LASERJET 2200 laser printers include 250-sheet input trays and manual feed sheet input as standard features.

In addition to standard features, each external device may be configured to include optional features or, commonly, "add-on" features. Moreover, with add-on features, one external device may be configured differently from that of another external device of the same model having the same standard features. Some examples of add-on features for an external printer includes optional input or output trays, an envelope feeder, a duplex unit for printing on both sides of one page or increased memory capacity.

The device driver must be properly configured to operate all the features provided by the external device. Illustratively, a printer driver must be configured so as to an accommodate an external printer having an optional envelope feeder. Because they are typically configured to include just standard features, device drivers must be manually configured to include optional features for operation thereof.

Specifically, to operate the optional envelope feeder of the above illustration, the installer must first install the printer driver in the host computer operating system. Once installed, a user must interface with a configuration settings component provided by the printer driver and a configuration registry of the host computer operating system. The user must then alter the driver and host configurations to include the envelope feeder as the desired feature to ensure proper activation of the external printer.

Unfortunately, because either the manual interface process is often difficult or a user simply does not know how to configure a device, a vast majority of external device users fail to configure for optional features. As a result, users often pay for professional help to solve a technically simple problem.

In some instances, instead of device driver software that is commonly provided by the manufacturer, sophisticated external device users install specialized bi-directional communications software to run with the host operating system. Bi-directional software interacts between the host system and the external device to facilitate feature configuration of the external device. However, bi-directional software strictly requires a network connection in lieu of the standard hardware cable connections. In short, bi-directional software often complicates the problem of external device configuration in that it is specialized and requires an environment not supported by all systems that use external devices.

Thus, as a matter of saving cost, labor, and time, there is a need in the art for providing a system and method for recognizing and configuring features included with an external device without additional hardware and software installation. It, therefore, is an object of this invention to provide a system and method for recognizing optional features included with an external device and configuring a host system to operate those features.

SUMMARY OF THE INVENTION

Accordingly, a system for connecting an external device and a host system includes an input/output code element linked with the external device. The input/output code element generates a device identification string. The device identification string includes an optional feature component associated with the external device. The optional feature component indicates at least one extra feature that is included with a particular external device, such as an envelope feeder for a printer or an audio component for a wireless Internet appliance.

The system further includes an installer linked with the host system. The installer receives the device identification string and parses the string for the optional feature component. The installer creates an add-on identifier key in the host system's registry based on the optional feature component. In the preferred embodiment, the add-on identifier key is created for each extra feature. It should be added that the device identification string is sent by the external device to the host system through a cable or, in the alternative, a wireless interface.

The system further includes a device driver for operating all features of the external device identified by the device identification string, especially the optional feature component. In particular, the device driver accesses the add-on identifier key in the registry. The device driver includes a device driver configuration component which is modified in accordance with the add-on identifyer key to include features associated with the optional feature component.

In a further embodiment of the present invention, the system for connecting an external device and a host system is specifically applied to printers. Accordingly, the device driver comprises a printer driver and the external device comprises an external printer device. It should be added, however, that the present invention provides for the connection of the host system with any type of external device, such as a scanner, a video recorder, or a disk drive for example.

In a still further embodiment of the present invention, a method for connecting an external device and a host system is provided so that an input/output code element links with an external device. Accordingly, the input/output code element generates a device identification string that includes an optional feature component that is associated with the external device.

DESCRIPTION OF THE DRAWINGS

Other objects, features, and advantages of the present invention will become more fully apparent from the following detailed description of the preferred embodiments, the appended claims and the accompanying drawings in which:

FIG. 5 is a schematic diagram of a device identification string sending sequence executed by the external device of FIG. 1;

DETAILED DESCRIPTION OF THE INVENTION

The preferred embodiments of the present invention are illustrated by way of example in FIGS. 1–7. With specific reference to FIG. 1, a host system 20 and an external device 30 are connected to one another by a system 10. In general, unique to the present invention, system 10 recognizes optional features included with the external device 30 and configures the host system 20 to operate the external device 30 having optional features.

Figure 3:
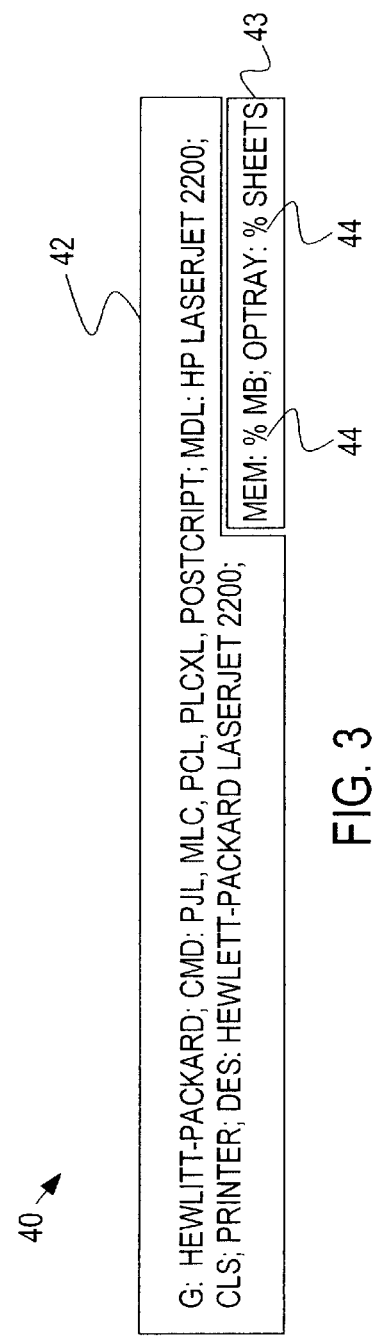
FIG. 3 is a schematic diagram illustrating an example of a device identification string including an optional feature component.
Figure 4B:
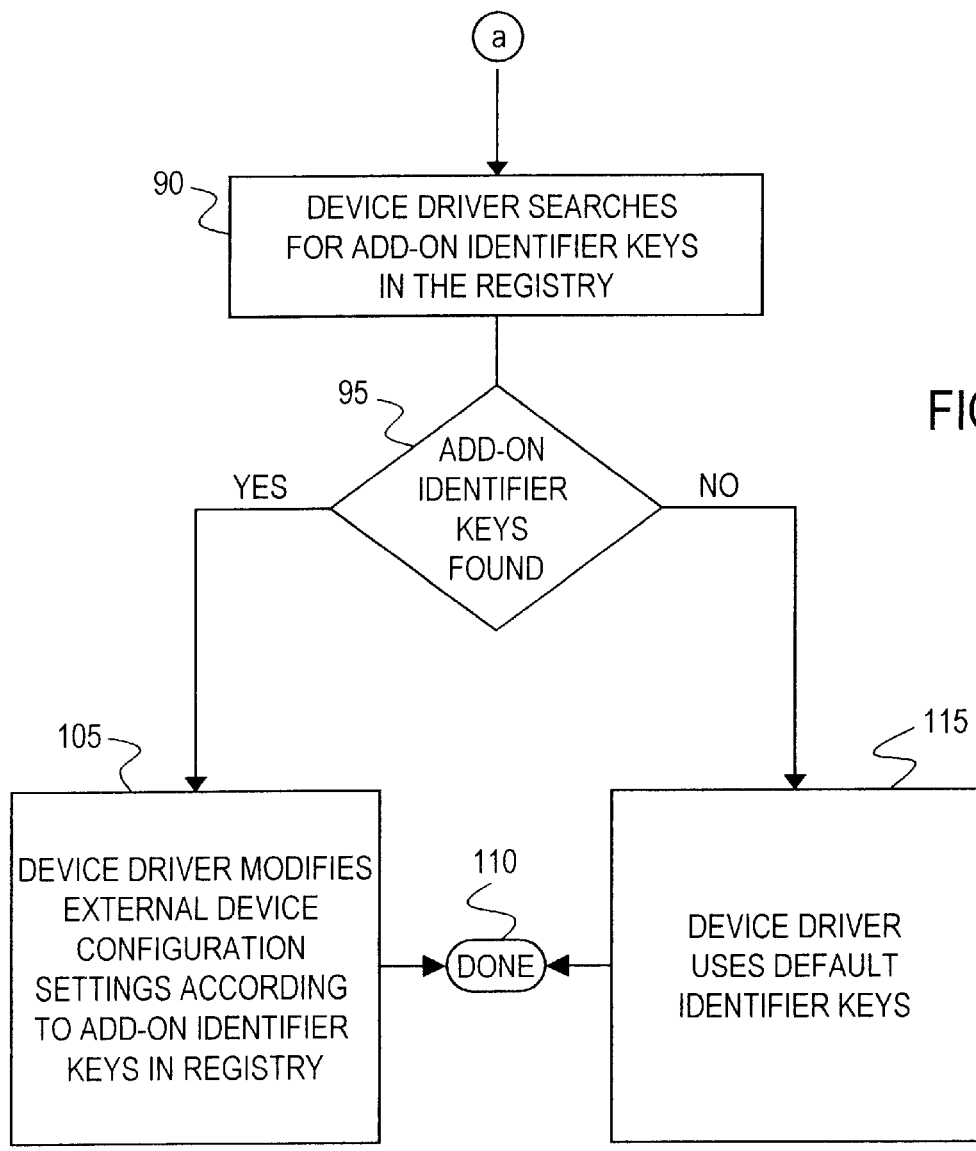
FIG. 4 is a schematic diagram of an add-on identifier key sequence executed by the host system of FIG. 1.

By receiving a device identification string or "device idstring", the host system 20 recognizes that the external device 30 is integrated with the host system 20 so that the external device 30 may properly receive instructions and applications from the host system 20. An example of a device idstring having data fields for a Hewlett-Packard LASERJET2200 laser printer is illustrated in FIG. 3. Accordingly, as discussed in detail below, the external device 30 provides a device idstring.

Figure 7B:
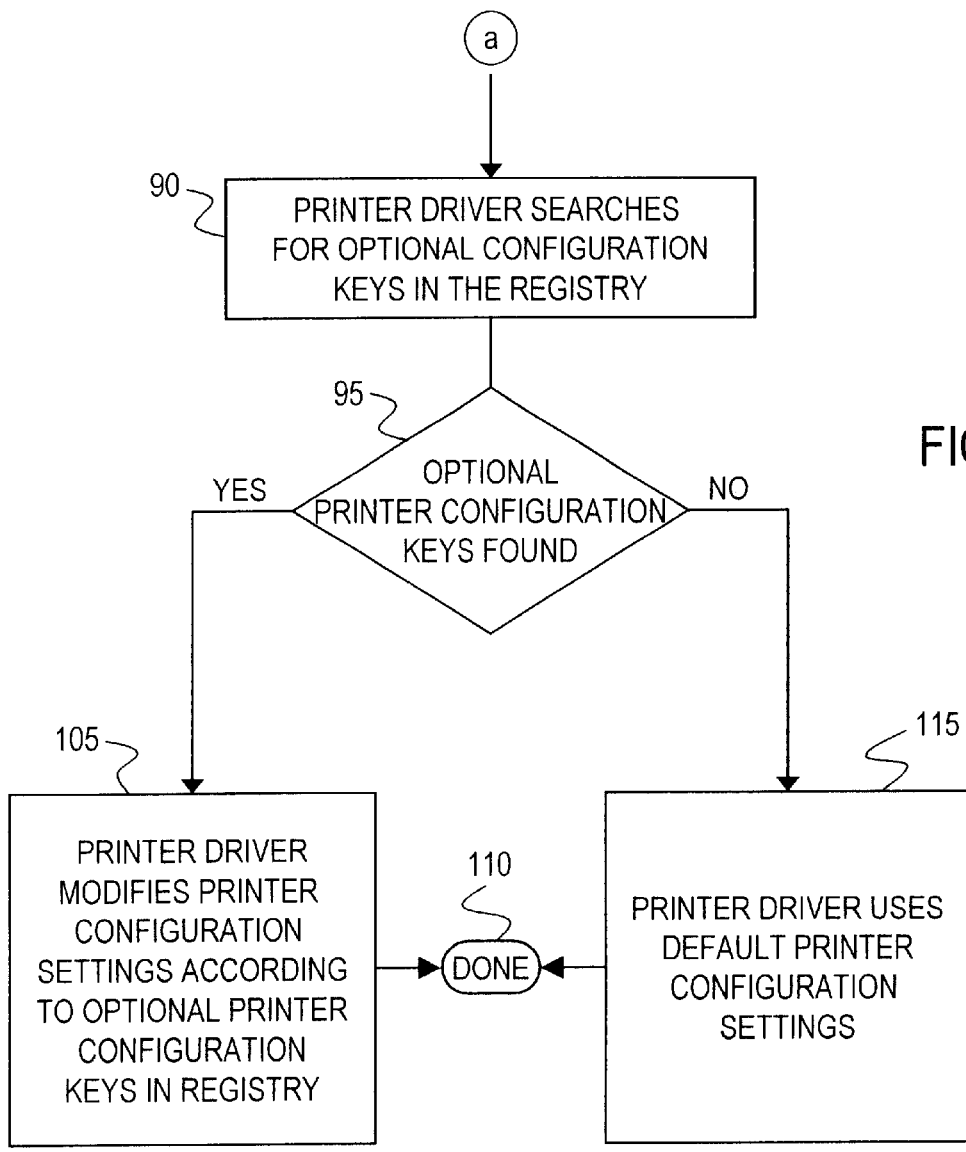
FIG. 7 is a schematic diagram of the add-on identifier key sequence of FIG. 4 as directed to an external printer device.

The system 10 operates with any type of external device that bears a device idstring. Examples of external devices are a video camera or recorder, a disc drive, a digital imager, a monitor, audio speakers, or a printer, among others. For purposes of illustration, FIGS. 4 and 7 show one preferred embodiment of present invention whereby the external device 30 comprises an external printer device.

Figure 1:
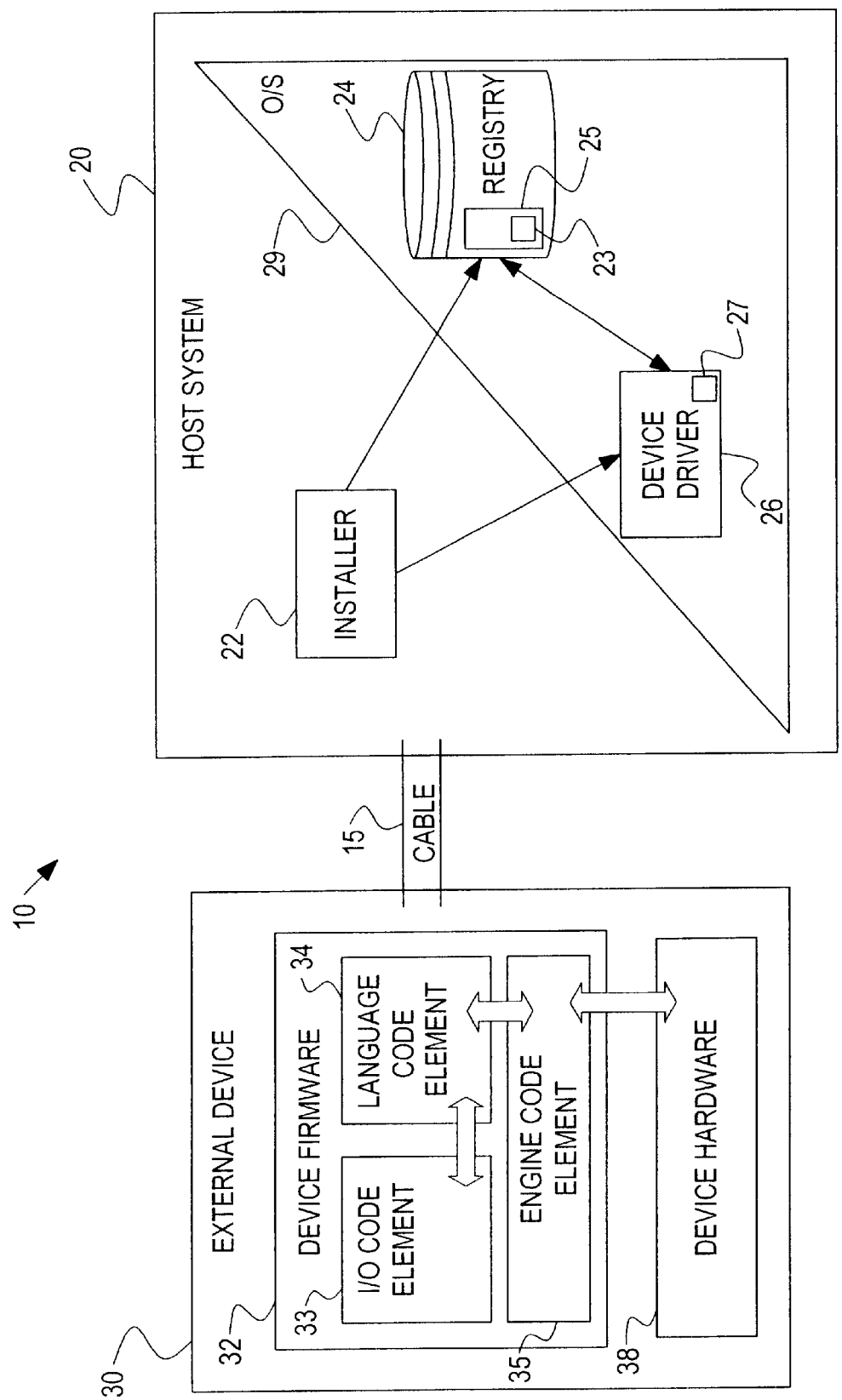
FIG. 1 is a schematic diagram of a preferred embodiment of the system of the present invention for connecting an external device and a host system, the system featuring an input/output code element for generating a device identification string that includes an optional feature component.

Referring to FIG. 1, the external device 30 includes device firmware 32 and device hardware 38. The device hardware 38 includes component parts that define the external device 30. For example, an external device 30 features standard components such as the memory boards, input/output interfaces and/or ports, and display indicators. An external device 30 may also include optional component features such as an envelope feeder for a printer or an audio component for a wireless Internet appliance.

The device firmware 32 is a set of software codes of a type well known in the industry for operating the external device 30. The device firmware 32 is stored in memory within the external device 30.

In particular, the device firmware 32 includes an input/output code element 33, a language code element 34, and an engine code element 35. The engine code element 35 enables the device firmware 32 to inventory standard and optional features included with each external device 30.

The engine code element 35 is coupled to the device hardware 38 and software associated with the device hardware 38. Specifically, in the preferred embodiment, software interfaces (not shown) are provided for linking the engine code element 35 with the device hardware 38. The software interfaces are of types well known in the industry.

The language code element 34 is coupled with the engine code element 35 so as to translate languages sent from the host system 20 to machine languages that are executable by the device hardware 38. The input/output code element 33 or "i/o" code element 33 is linked with the language code element 34 and the engine code element 35.

The i/o code element 33 processes all incoming and outgoing data. For incoming data, the i/o code element 33 sends instructions and applications to the device hardware 38 through the language code element 34 and across the engine code element 35. In a similar manner, i/o code element 33 sends instructions from the device hardware 38 to the host system 20. Preferably, instructions travel from the device hardware 38 through the engine code element 35 across the language code element 34 to the i/o code element 33. In this manner, a device idstring is sent from the device firmware 32 of each external device 30 that is connected with the host system 20.

Referring now to the device identification sending sequence 500 of FIG. 5, the manner by which a device idstring is sent from an external device 30 to the host system 20 is set forth. In step 505, the host system 20 requests a device idstring from the external device 30. As such, the i/o code element 33 in step 510 accesses the engine code element 35 to assist with generating a device idstring. The engine code element 35 is linked with the device hardware 38 so as to determine which add-on features are included with that particular external device 30.

In step 515, the engine code element 35 inventories all hardware associated with the external device 30 and sends a resulting inventory list to the i/o code element 33. The i/o code element 33 in step 520 generates a device idstring from the inventory list. As discussed further below, the i/o code element 33 generates a device idstring via a device identification string generating sequence 600. In step 525, the i/o code element 33 sends the device idstring to the requesting host system 20 before completing the sequence 500 in step 530.

Referring back to FIG. 1, it should also be said that a cable 15, in a preferred embodiment, is provided by the system 10 for facilitating transmission of data between the external device 30 and the host system 20. As shown in FIG. 1, the cable 15 is linked to the host system 20 and the external device 30. Preferably, the cable 15 comprises a parallel cable of a type well known in the industry. In operation, the device idstring is sent from the external device 30 by the i/o code element 33 across the cable 15 to the host system 20 for reception by an installer 22 as well as a device driver 26. As an alternative to the cable 15, the system 10 may include a wireless interface (not shown) for facilitating transmission of data between the external device 30 and the host system 20. The wireless interface is of any type well known in the industry or hereafter developed. In any case, in operation, the device idstring is sent from the external device 30 by the i/o code element 33 across the wireless interface to the host system 20 for reception by the installer 22 and the device driver 26.

FIG. 3 shows a device idstring in a concatenated format generated by the device firmware 32 of every external device 30 coupled to the host system 20. For purposes of illustration, FIG. 3 shows a device idstring for a Hewlett Packard LASERJET 2200 laser printer. In general, the i/o code element 33 generates a device idstring by assigning data field values to a template 40. The template 40 is prestored in the memory of the external device 30.

The template 40 is divided into a standard features component 42 and an optional features component 43. The standard features component 42 lists data fields for those features that are commonly shared by every external device of a particular model. Illustratively, the standard features component 42 for a HP LASERJET 2200 laser printer lists data fields for every HP LASERJET 2200 laser printer model, such as "PCL" for PCL language support or "POSTSCRIPT" for PostScript language support.

In the same manner, the optional features component 43 lists data fields for all add-on features offered by that model of external device. Ultimately, each external device 30 need only include some add-on features from the complete offering. With add-on features, one external device 30 may be configured differently from that of another external device 30 of the same model having the same standard features.

For example, as shown in FIG. 3, the optional features component 43 lists data fields for all add-on features for a HP LASERJET 2200 model laser printer, such as "MEM:% MB" for optional expanded memory or "OPTRAY:% Sheets" for an optional feeder tray. Other examples of add-on features for an external printer include optional input or output trays, an envelope feeder, a duplex unit for printing on both sides of one page or increased memory capacity. Although every HP LASERJET 2200 may accommodate expanded memory or a feeder tray, it is unlikely that a user will require that each model include every add-on feature. As such, the template 40 provides input variables 44, as shown in FIG. 3 as "%".

In operation, the engine code element 35 searches the device hardware 38 for add-on features that are included for a specific external device 30 for connection to the host system (20). After determining those add-on features that are included and not included with that particular external device 30, the engine code element 35 prompts the i/o element 33 to access and scan the template 40. Specifically, the i/o element 33 scans the optional features component 43 for the input variables 44.

In effect, each input variable 44, "%", acts as a marker for enabling the i/o code element 33 to locate and insert data field values along the template 40. By scanning the template 40, the i/o code element 33 substitutes input variables 44 with data fields for included add-on features as well as nullifies input variables 44 for add-on features that were not included with that specific external device 30. By revising the template to include relevant add-on features, the i/o code element 33 formats the template into a resulting device id string.

Figure 6:
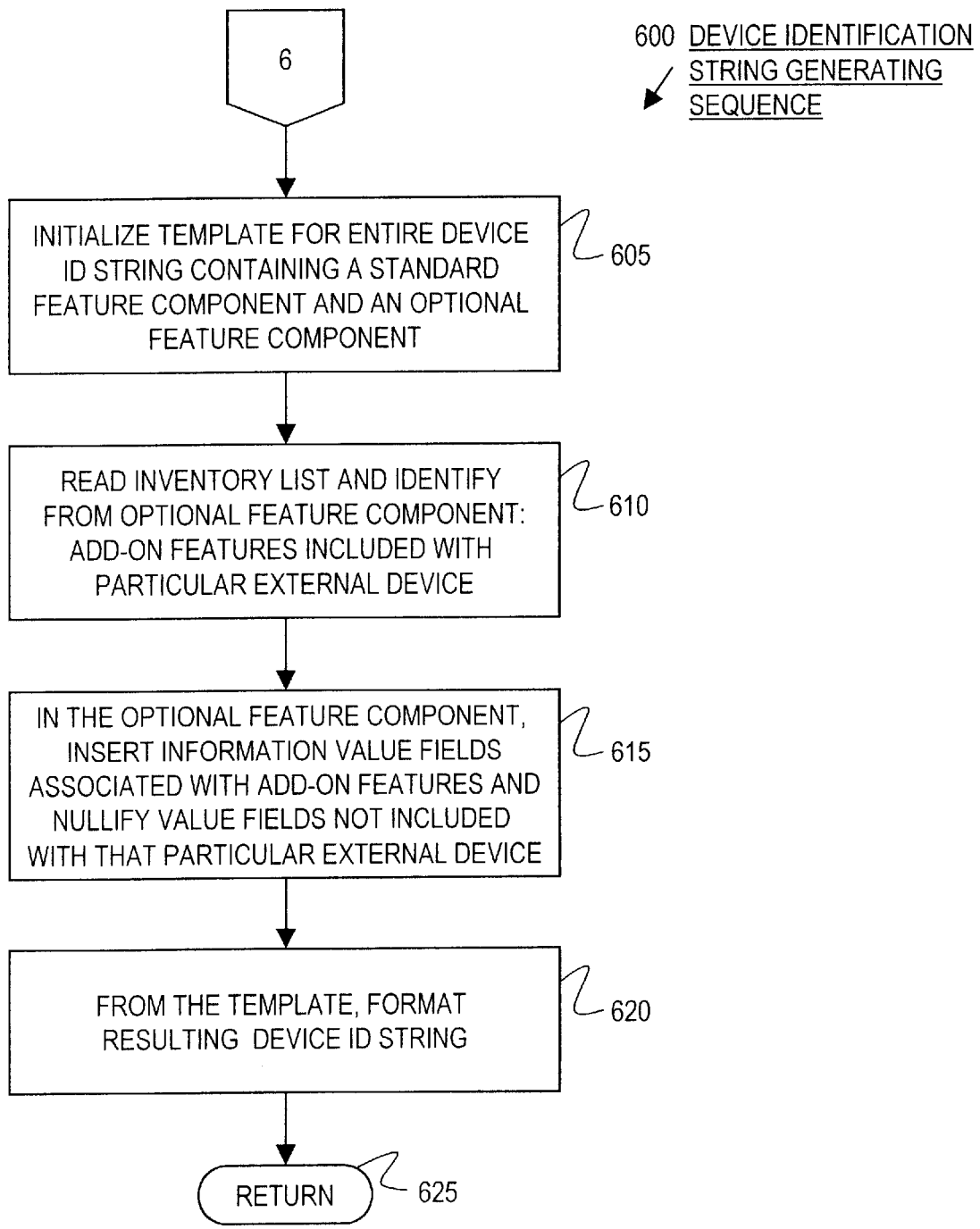
FIG. 6 is a schematic diagram of a device identification string generating sequence executed by the input/output code element of FIG. 1.

Specifically, with reference to FIG. 6, the i/o code element 33 implements the device identification string generating sequence 600. The i/o code element 33 in step 605 initializes a template 40 for forming a device identification string associated with the external device 30. Initialization includes retrieving a template from memory storage of the external device 30 for use by the i/o code element 33. Initialization further includes ensuring that the template 40 includes standard feature components 42 as well as optional feature components 43.

In step 610, the i/o code element 33 reads an inventory list for hardware data field values gathered by the engine code element 35. Further, the i/o code element 33 in step 610 identifies optional feature components included with that specific external device.

In step 615, the i/o code element 33 accesses each input variable 44. For each input variable 44, the i/o code element 33 either inserts data field values associated with the included optional feature components or nullifies value fields not included with the particular external device 30.

In step 620, the i/o code element 33 formats the template 40 into a resulting device idstring. Formatting includes revising the template so that relevant optional feature components are included with the particular external device 30.

In this disclosure and the appended claims, the host system 20 is any computer-based system for executing software program applications in conjunction with the external device 30. Examples of computer-based systems include, but are not limited to, a workstation computer, a laptop computer, a wireless device, such as a MOTOROLA SKYTEL pager, or PALM PILOT, or an Internet appliance such as Microsoft's web television or a personal Internet appliance. Moreover, software applications are generated by software programs within the host system, such as word processing or graphics programs for example.

Illustratively, a computer workstation may execute word processing or graphics programs in conjunction with an external printer device. As such, the computer work station is an example of a host system 20 and the external printer device is an example of an external device 30.

Referring again to FIG. 1, the host system 20 includes operating system 29, such as WINDOWS, for controlling the execution of programs or for what is commonly called "running" programs. The operating system 29 includes a registry 24. Data field values for configuring operation of the host system 20 in accordance with default and user preferences are allocated memory storage in the registry 24. These data fields represent different aspects or "features" of the host system 20. Some features may be standard features such as the brightness of a monitor whereas other features may be optional such as a user's browser preferences. Nonetheless, each data field is assigned a separate key in the registry 24. Each key stores a data field value in the registry 24. Collectively, the keys store particular preferences for operating the host system 20.

As the system 10 is initially connecting with the host system 20 and the external device 30, the host system 20 runs the installer 22. The installer 22 is an executable installation program that is associated with the external device 30. The installer 22 installs software components in the operating system 29 of the host system 20. In general, the installer 22 installs software components for enabling the host system 20 to operate the external device 30. The installer 22 installs at least one device driver 26 as well as other device utilities, such as for example a font management utility or a status monitor. The installer 22 may also interactively provide the user with merchandising information associated with the external device 30, such as verification of warranty registration and software license agreements.

The device driver 26 is a software component that runs in the operating system 29. Through the device driver 26, the host system 20 operates the external device 30. In particular, the device driver 26 translates applications and operating system commands into commands that are recognized by that specific model of external device 30. Within the operating system 29, the device driver 26 and application software interact with one another permitting the external device 30 to execute resulting applications. For example, a printer driver allows applications software, such as word processing or graphics software, to print to an external printer.

As shown in FIG. 1, the device driver 26 includes a configuration settings component 27. The configuration settings component 27 is linked with the external device 30. The host system 20 operates the external device based on the configuration settings component 27. To properly operate all the features provided by the external device 30, the configuration settings component 27 must be configured to match all features included with the external device 30. Illustratively, a printer driver must be configured so as to an accommodate an external printer device having an optional envelope feeder.

Generally, to ensure that the device driver 26 operates with properly matched features, the registry 24 includes an identifier key array 25. Preferably, the identifier key array 25 collectively refers to all the identifier keys for operating the host system 20 stored in the registry 24. The identifier key array 25 is linked with the installer 22 for tracking all features of the external device 30. The identifier key array 25 stores each feature, standard as well as optional, in the registry 24.

The configuration settings component 27 is linked with the identifier key array 25 so that the device driver 26 reads all features from the identifier key array 25 and sets the configuration settings component 27 to reflect all the features in identifier key array 25. Preferably, the identifier key array 25 must include all the features of the external device 30 so that the device driver 26 operates all the features of the external device 30 via the configuration settings component 27. In operation, the configuration settings component 27 selectively accesses all the features of the external device 30 allowing the device driver 26 to successfully execute application and operating system commands as recognized by that specific model of external device 30.

It should be noted that the installer 22 reads a device idstring from the external device 30. By referencing the device idstring, the installer 22 writes identifier keys into the identifier key array 25 of the registry 24. Each identifier key represents a feature of the external device 30 for interaction with the host system 20. The installer 22 writes identifier keys for standard as well as optional features of the external device 30.

Figure 2:
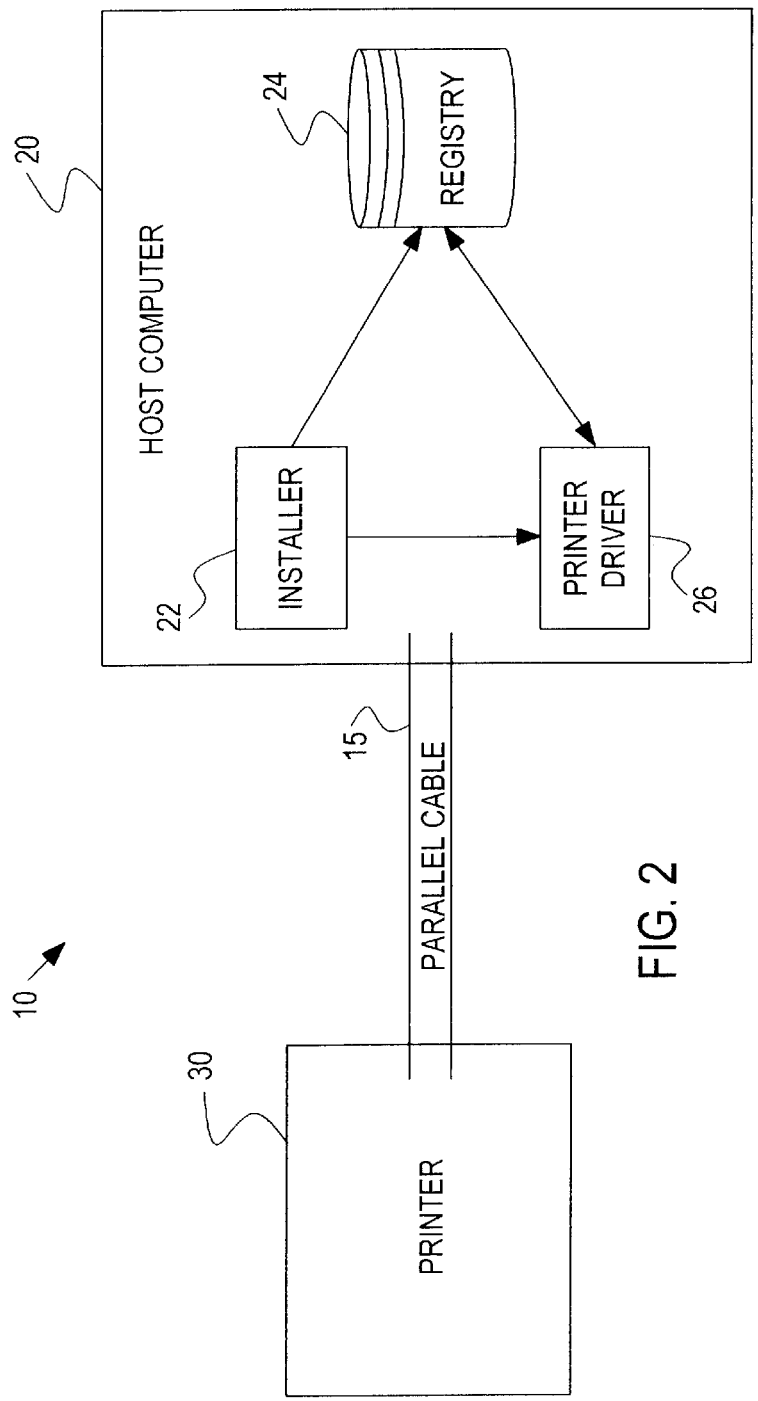
FIG. 2 is a schematic diagram of one embodiment of the system of the present invention for connecting an external device and a host system, the system featuring an external printer device as an external device.

With specific reference to FIG. 2, the installer 22 preferably writes identifier keys into the registry 24 via an add-on identifier sequence 100 illustrated in FIG. 4. As shown in FIG. 4A, in step 55 of the add-on identifier sequence 100, the installer 22 requests a device idstring from the external device 30. A device idstring is generated via the device identification string generating sequence 600 of FIG. 6. In step 60, the device idstring is sent from the external device 30 to the host system 20 via the device identification string sending sequence 500 of FIG. 5.

Steps 70–80 of FIG. 4A outline an add-on identifier key insertion routine 150. Whereas users in the past interfaced with the device driver 26 for inserting data fields associated with optional features, the installer 22 in the preferred add-on identifier key insertion routine 150 writes identifier keys for optional as well as standard features without interfacing with the user. By reading the device idstring, the installer 22 writes identifier keys in the identifier key array 25 for optional and standard features. For each device idstring, the installer 22 reads the optional feature component 43 to write identifier keys for optional features.

Specifically, in step 70, the installer 22 reads the device idstring sent from the external device 30. The installer 22 in step 75 parses the device idstring for the optional feature component 43 and the standard feature component 42. By reading the optional feature component 43, the installer 22 in step 80 creates add-on identifier keys 23 within the identifier key array 25. Preferably, each add-on identifier key 23 represents a separate optional feature associated with the external device 30.

In step 85, the installer 22 installs the device driver 26 in the operating system 29. Ultimately, the device driver 26 operates the external device 30 based on the optional feature component 43. As the host system 20 and the external device 30 operate to execute applications and instructions, the device driver 26 in step 90 (of FIG. 4B) searches for the add-on identifier key 23 in the registry 24. In step 95, the device driver 26 determines whether an optional feature, such as an envelope feeder for a laser printer, is included with the external device 30 by referencing the identifier key array 25.

For each add-on identifier key in the identifier key array 25, the device driver 26 in step 105 modifies the configuration settings component 27 based on the optional feature component 43. Before ending the add-on identifier sequence 100 in step 110, the configuration settings component 27 in step 105 is modified according to the add-on identifier key in the registry 24. Alternatively, for a lack of a specific add-on identifier key, the device driver 26 in step 115 recognizes that the particular external device 30 does not include such an optional feature. As a result, the device driver 26 will continue to operate with default identifier keys in the identifier key array 25 before advancing to step 110.

By way of example, FIG. 7 shows the add-on identifier sequence 100 of FIG. 1 as applied to an external printer device. Preferably, as shown in FIG. 2, the device driver 26 comprises a printer driver and the external device 30 comprises an external printer device.

With specific reference to the add-on identifier sequence 100 of FIG. 7, the installer 22 in step 55 requests a device idstring from the printer. A device idstring is generated via the device identification string generating sequence 600 of FIG. 6. In step 60, the device idstring is sent from the printer to the host system 20 via the device identification string sending sequence 500 of FIG. 5.

Steps 70–80 outline an add-on identifier key insertion routine 150. The installer 22 in the preferred add-on identifier key insertion routine 150 writes identifier keys for optional features without interfacing with the user. By reading the device idstring, the installer 22 writes identifier keys in the identifier key array 25 for optional features associated with the printer. For each device idstring, the installer 22 reads the optional feature component 43 to write identifier keys for optional features.

Particularly, in step 70, the installer 22 reads the device idstring sent from the printer. The installer 22 in step 75 parses the device idstring for the optional feature component 43 and the standard feature component 42. By reading the optional feature component 43, the installer 22 in step 80 creates add-on identifier keys 23 within the identifier key array 25. Preferably, each add-on identifier key 23 represents separate optional features associated with the printer.

In step 85, the installer 22 installs the printer driver in the operating system 29. Ultimately, the printer driver operates the printer based on the optional feature component 43. As the host system 20 and the printer operate to execute applications and instructions, the printer driver in step 90 searches for the add-on identifier key 23 in the registry 24. In step 95, the printer driver determines whether an optional feature, such as an envelope feeder for a laser printer, is included with the printer by referencing the identifier key array 25.

For each add-on identifier key in the identifier key array 25, the printer driver in step 105 modifies the configuration settings component 27 based on the optional feature component 43. Before ending the add-on identifier sequence 100 in step 110, the configuration settings component 27 in step 105 is modified according to the add-on identifier key in the registry 24. Alternatively, for a lack of a specific add-on identifier key, the printer driver in step 115 recognizes that the particular printer does not include such an optional feature. As a result, the printer driver will continue to operate with default identifier keys in the identifier key array 25 before advancing to step 110.

While the present invention has been disclosed in connection with the preferred embodiments thereof, it should be understood that there may be other embodiments which fall within the spirit and scope of the invention as defined by the following claims.

What is claimed is:

1. A system for connecting an external device and a host system, the host system including a registry, the system comprising:
   (a) input/output code on the host system linked with the external device;
   (b) the input/output code generating a device identification string for the external device;
   (c) the device identification string including identification of an optional feature of the external device;
   (d) wherein the input/output code scans the optional feature for a corresponding add-on feature for the external device;
   (e) an installer linked with the host system wherein the installer receives the device identification string from the external device and wherein the installer creates an add-on identifier key in a registry based on the optional feature; and
   (f) a device driver linked with the host system, the device driver including configuration settings linked to the external device wherein the device driver accesses the add-on identifier key in the registry and automatically modifies the configuration settings to include the add-on feature of the external device.

2. The system according to claim 1 wherein the device driver operates the external device based on the optional feature.

3. The system according to claim 1 wherein the installer parses the device identification string for the optional feature.

4. The system according to claim 1 wherein the device identification string is sent from the external device by the input/output code across a cable to the host system for reception by the installer.

5. The system according to claim 1 wherein the device identification string is sent from the external device by the input/output code across a wireless interface to the host system for reception by the installer.

6. A system for connecting an external printer device and a host system, the host system including a registry, the system comprising:
   (a) input/output code on the host system linked with the external printer device;
   (b) the input/output code generating a device identification string for the external printer device;
   (c) the device identification string including an identification of an optional feature of the external printer device;
   (d) wherein the input/output code scans the optional feature for a corresponding add-on feature for the external printer device;
   (e) an installer linked with the host system wherein the installer receives the device identification string from the external printer device and wherein the installer creates an add-on identifier key in a registry based on the optional feature; and
   (f) a printer driver linked with the host system, the printer driver including configuration settings linked to the external printer device wherein the printer driver accesses the add-on identifier key in the registry and automatically modifies the configuration settings to include the add-on feature of the external printer device.

7. A method for connecting an external device and a host system, including a registry, comprising the steps of:
  (a) linking an input/output code on a host system with the external device;
  (b) generating a device identification string for the external device with the input/output code;
  (c) the device identification string including identification of an optional feature of the external device;
  (d) wherein the input/output code scans the optional feature for a corresponding add-on feature for the external device,
  (e) linking an installer with the host system wherein the installer receives the device identification string from the external device and wherein the installer creates an add-on identifier key in a registry based on the optional feature; and
  (f) linking a driver with the host system, the driver including configuration settings linked to the external device such that the driver accesses the add-on identifier key in the registry and automatically modifies the configuration settings to include the add-on feature of the external device.

8. The method according to claim 7 further comprising the step of operating the external device with the host system via the device driver.

9. The method according to claim 7 further comprising the step of operating the external device based on the optional feature.

* * * * *